(12) United States Patent
Chen et al.

(10) Patent No.: US 10,848,305 B2
(45) Date of Patent: Nov. 24, 2020

(54) KEY GENERATION INFORMATION TREES

(71) Applicant: Hewlett-Packard Development Company, L.P., Houston, TX (US)

(72) Inventors: Liqun Chen, Bristol (GB); Boris Balacheff, Lyons (FR); Fraser Dickin, Bristol (GB); Taciano Perez, Porto Alegre (BR); Wagston Staehler, Porto Alegre (BR); Craig Walrath, Spring, TX (US); James M Mann, Cypress, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 72 days.

(21) Appl. No.: 15/770,554

(22) PCT Filed: Mar. 21, 2016

(86) PCT No.: PCT/US2016/023469
§ 371 (c)(1),
(2) Date: Apr. 24, 2018

(87) PCT Pub. No.: WO2017/111985
PCT Pub. Date: Jun. 29, 2017

(65) Prior Publication Data
US 2019/0058588 A1 Feb. 21, 2019

(30) Foreign Application Priority Data
Dec. 21, 2015 (EP) ..................... 15307090

(51) Int. Cl.
*H04L 9/08* (2006.01)
*G06F 12/14* (2006.01)
(Continued)

(52) U.S. Cl.
CPC ........ *H04L 9/0897* (2013.01); *G06F 12/1408* (2013.01); *G06F 21/6218* (2013.01);
(Continued)

(58) Field of Classification Search
CPC ... H04L 9/0897; H04L 9/0836; H04L 9/0861; H04L 9/0863; H04L 2209/127;
(Continued)

(56) References Cited

U.S. PATENT DOCUMENTS

| 8,249,257 B2 | 8/2012 | Brutch et al. |
| 8,386,800 B2 | 2/2013 | Kocher et al. |

(Continued)

FOREIGN PATENT DOCUMENTS

| WO | WO2015112126 A1 | 7/2015 |
| WO | WO2015116032 A1 | 8/2015 |
| WO | WO2017048221 A1 | 2/2018 |

OTHER PUBLICATIONS

Sundberg, M and Nilsson, E. "Emulation of TPM on Raspberry Pi" [online], Mar. 19, 2015 [retrieved Feb. 14, 2020]. Retrieved from the Internet: http://lup.lub.lu.se/luur/download?func=downloadFile &recordOld=5157718&fileOld=5157721 (Year: 2015).*

(Continued)

*Primary Examiner* — Taghi T Arani
*Assistant Examiner* — Joshua Raymond White
(74) *Attorney, Agent, or Firm* — HPI Patent Department

(57) ABSTRACT

An example non-transitory computer-readable medium includes instructions that, when executed by a processor, cause the processor to receive a request for data. The instructions also cause the processor to determine a region containing the data based on the metadata. The instructions cause the processor to traverse a tree in the metadata to determine key generation information relating a decryption key for the region to a root key.

11 Claims, 8 Drawing Sheets

(51) Int. Cl.
*G06F 21/62* (2013.01)
*G06F 21/79* (2013.01)

(52) U.S. Cl.
CPC ............ *G06F 21/79* (2013.01); *H04L 9/0836* (2013.01); *H04L 9/0861* (2013.01); *H04L 9/0863* (2013.01); *G06F 2212/1052* (2013.01); *H04L 2209/127* (2013.01)

(58) Field of Classification Search
CPC .. G06F 12/1408; G06F 21/6218; G06F 21/79; G06F 2212/1052
See application file for complete search history.

(56) References Cited

U.S. PATENT DOCUMENTS

| | | | |
|---|---|---|---|
| 8,839,000 | B2 | 9/2014 | Walrath |
| 9,021,272 | B2 | 4/2015 | Debout et al. |
| 9,317,708 | B2* | 4/2016 | Lee ................. G06F 21/6218 |
| 2002/0059286 | A1* | 5/2002 | Challener ............ H04L 9/0836 |
| 2005/0238175 | A1 | 10/2005 | Plotkin et al. |
| 2009/0268903 | A1* | 10/2009 | Bojinov ................ H04L 9/0894 |
| | | | 380/45 |
| 2011/0093693 | A1 | 4/2011 | Ibrahim et al. |
| 2011/0099362 | A1 | 4/2011 | Haga et al. |
| 2011/0252243 | A1* | 10/2011 | Brouwer ................ G06F 21/62 |
| | | | 713/189 |
| 2012/0017097 | A1 | 1/2012 | Walrath |
| 2012/0233472 | A1 | 9/2012 | Faraboschi et al. |
| 2014/0237231 | A1* | 8/2014 | Spalka ................ H04L 63/0471 |
| | | | 713/165 |
| 2014/0331294 | A1* | 11/2014 | Ramallo ................ G06F 21/35 |
| | | | 726/5 |
| 2015/0082048 | A1 | 3/2015 | Ferguson |
| 2015/0082084 | A1* | 3/2015 | Guyot ................ G06F 11/1662 |
| | | | 714/15 |
| 2015/0248568 | A1 | 9/2015 | Offenberg et al. |
| 2017/0187526 | A1* | 6/2017 | Ferguson ............. G06F 9/4401 |

OTHER PUBLICATIONS

"An Overview of the Linux Integrity Subsystem" [online] source archived of Nov. 27, 2015 [retrieved Feb. 14, 2020] Via: https://web.archive.org/web/20151127032700/https://sourceforge.net/p/linux-ima/wiki/Home; https://astuteinternet.dl.sourceforge.net/project/linux-ima/linux-ima/Integrity_overview.pdf (Year: 2015).*

Chhabra, S et al, "I-NVMM: A Secure non-volatile Main Memory System with Incremental Encryption", Jun. 4-8, 2011.

* cited by examiner

KEY GENERATION INFORMATION TREES

BACKGROUND

A computing device may include persistent main memory. As used herein, the terms "persistent main memory" and "non-volatile main memory" refer to memory that is directly addressable by a processor and that stores data even when power to the memory is lost. The persistent main memory may be, used as working memory to store transient data and may be used as long-term storage to store persistent data. The computing device with persistent main memory may not need to spend time moving data between secondary storage and main memory. Thus, the computing device may have better performance than a device that does spend time moving data between secondary storage and main memory.

DETAILED DESCRIPTION

Figure 1:
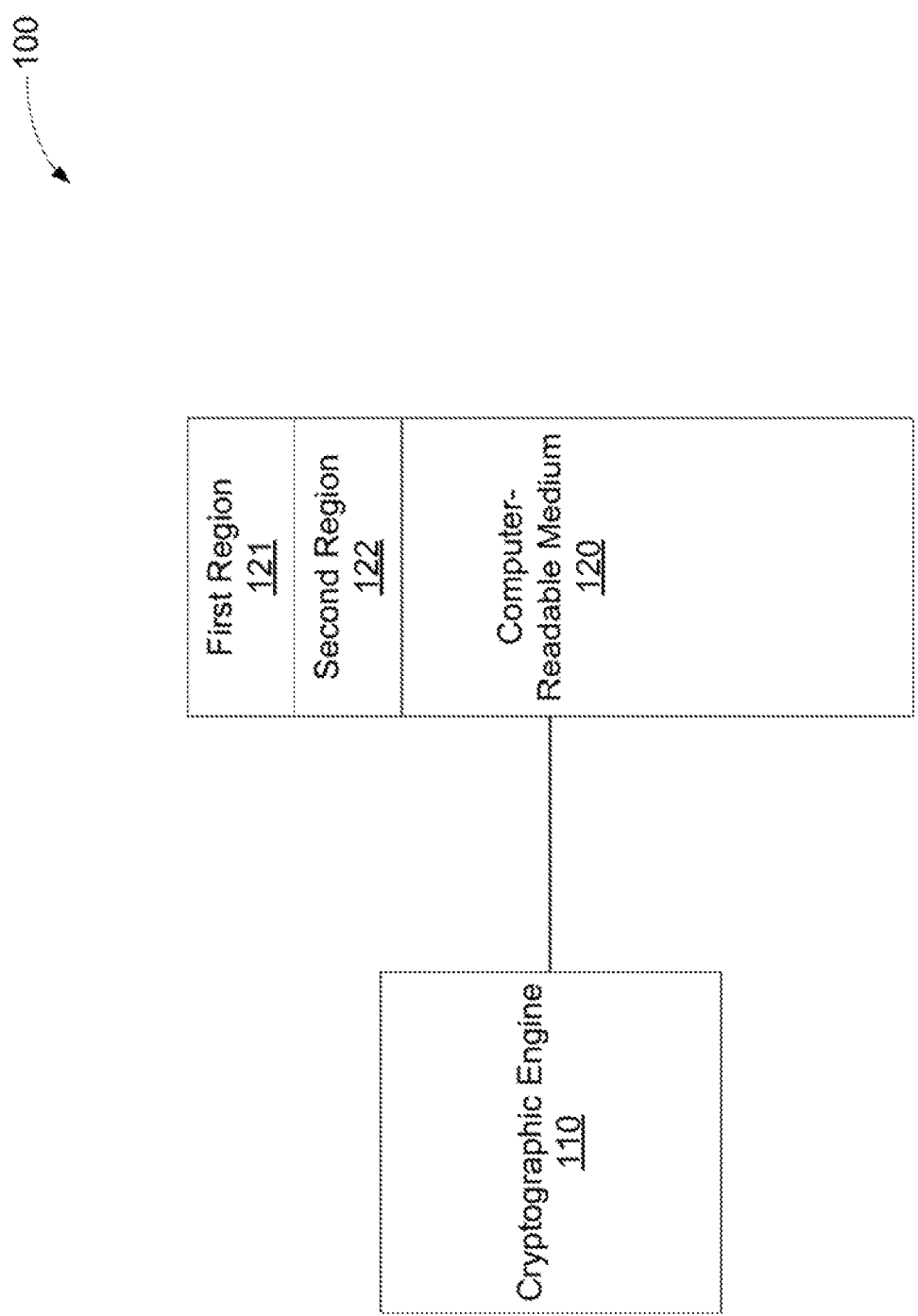
FIG. 1 is a block diagram of an example system to decrypt data on a computer-readable medium.

A computing device with persistent main memory may pose additional security risks. Even after power is lost, the persistent main memory may continue to store sensitive or important transient data. An attacker who gains access to the computing device may be able to steal or corrupt the transient data if it is left unprotected. In addition, sensitive or important persistent data may be stored, on the persistent memory. The attacker may also be able to steal or corrupt the persistent data if it is left unprotected. Accordingly, the persistent and transient data in the persistent main memory may be encrypted to protect the persistent and transient data.

A cryptographic engine may encrypt and decrypt the data on the persistent main memory. As used herein, the term "encrypt" refers to converting data to a form in which it is difficult to obtain the original data without a particular, key. The term "decrypt" refers to using a particular key to convert encrypted data back to its original form. The term "difficult" refers to an action that cannot be performed or cannot be performed without significant time, processing resources, or specialized tools. In an example, the computing device may execute a software program to encrypt and decrypt the data on the persistent main memory. However, the time for the software program to encrypt and decrypt the data may be so slow as to negate any performance benefit from replacing secondary storage with persistent main memory. Instead, the computing device may include hardware or firmware to encrypt and decrypt the data on the persistent main memory. For example, the hardware or firmware may be included in a system-on-chip (SoC) and may be between a memory controller on the SoC and the persistent main memory external to the SoC. Alternatively, the hardware or firmware may be a device separate from the SoC in the memory path between the memory controller and the persistent main memory.

The persistent main memory may be divided into a plurality of regions. Each region may be encrypted and decrypted by a different, unique key. For example, the memory may include unencrypted but digitally signed data, system data, user data, or the like. Using different keys may provide a higher level of security. A malicious system or user may be unable to steal or corrupt data from other systems or users because the malicious, system or user does not have the keys to access that data. The keys may have different properties, associated with them. Some keys may be migratable and may allow a user under appropriate circumstances to move the keys and associated data to another system or receive the keys and associated data. Other keys may be non-migratable and may not be provided to the user or other systems.

In an example, the keys may be stored in a secure location at the SoC or cryptographic engine that is difficult to access or tamper with. However, there may not be sufficient space in the secure storage to store every key as well as associated metadata, such as which regions of the persistent main memory are associated with each key, whether a key is migratable or not, etc. Information usable to generate each key and metadata associated with each key may be stored, in the persistent main memory. In an example, the metadata and key generation information may be stored as a list, but searching the list for the metadata and key generation information may be inefficient. Performance of the cryptographic engine may be improved by storing the metadata and key generation information efficiently in the persistent main memory.

FIG. 1 is a block diagram of an example system 100 to decrypt data on a computer-readable medium 120. The system 100 may include the computer-readable medium 120, which may include a plurality of regions 121, 122. The computer-readable medium 120 may be a non-transitory computer-readable medium, such as a volatile computer-readable medium (e.g., volatile random, access memory (volatile RAM), a processor cache, a processor register, etc.), a non-volatile computer-readable medium (e.g., a magnetic storage device, an optical storage device, a paper storage device, flash memory, read-only memory, non-volatile RAM, etc.), and/or the like. The regions 121, 122 may be distinct locations in the computer-readable medium 120 able to contain data.

The system 100 may include a cryptographic engine 110 communicatively coupled with the computer-readable medium 120. As used herein, the term "engine" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as RAM, a hard disk or solid-state drive, resistive memory, or optical media such as a digital versatile disc (DVD), and/or executed or interpreted by a processor), or hardware and software hosted at hardware.

The cryptographic engine 110 may store a root key. For example, the cryptographic engine 110 may store the root key in a secure location where it will be inaccessible to potential attackers. The cryptographic engine 110 may store the root key inside the cryptographic engine 110 or in a secure location external to the cryptographic engine 110. The cryptographic engine 110 may retrieve key generation information for one of the plurality of regions 121, 122 from a tree stored on the computer-readable medium 120. As used herein, the term "key generation information" refers to information that can be processed to produce a key. Additional information, such as another key, user credentials, or the like, may be needed to produce the key from the key generation information. The term "tree" refers to a data structure including a plurality of logically linked data elements (i.e., nodes) with at least one data element logically linked to two children. The term "child" of a first node refers to a second node referenced by the first node. The term "parent" of a first node refers to a second node containing a reference to the first, node. The term "branch" refers to a child, or further descendant, of a parent that has a plurality of children.

The cryptographic engine 110 may generate a decryption key for the region 121, 122 for which the key generation information was retrieved. The cryptographic engine 110 may generate the decryption key based on the key generation information and the root key. In an example, the key generation information may include an encrypted copy of the decryption key. The cryptographic engine 110 may decrypt the encrypted copy of the decryption key using the root key or a descendant of the root key. Alternatively, or in addition, the decryption key may be derived originally from the root key or a descendant using a random number. The key generation information may include the random number. The cryptographic engine 110 may rederive the decryption key based on the root key and the key generation information. The cryptographic engine 110 may decrypt data from the region 121, 122 for which the key generation information was retrieved using the decryption key. The cryptographic engine 110 may retrieve the encrypted data from the region 121, 122 and decrypt the data using the decryption key.

Figure 2:
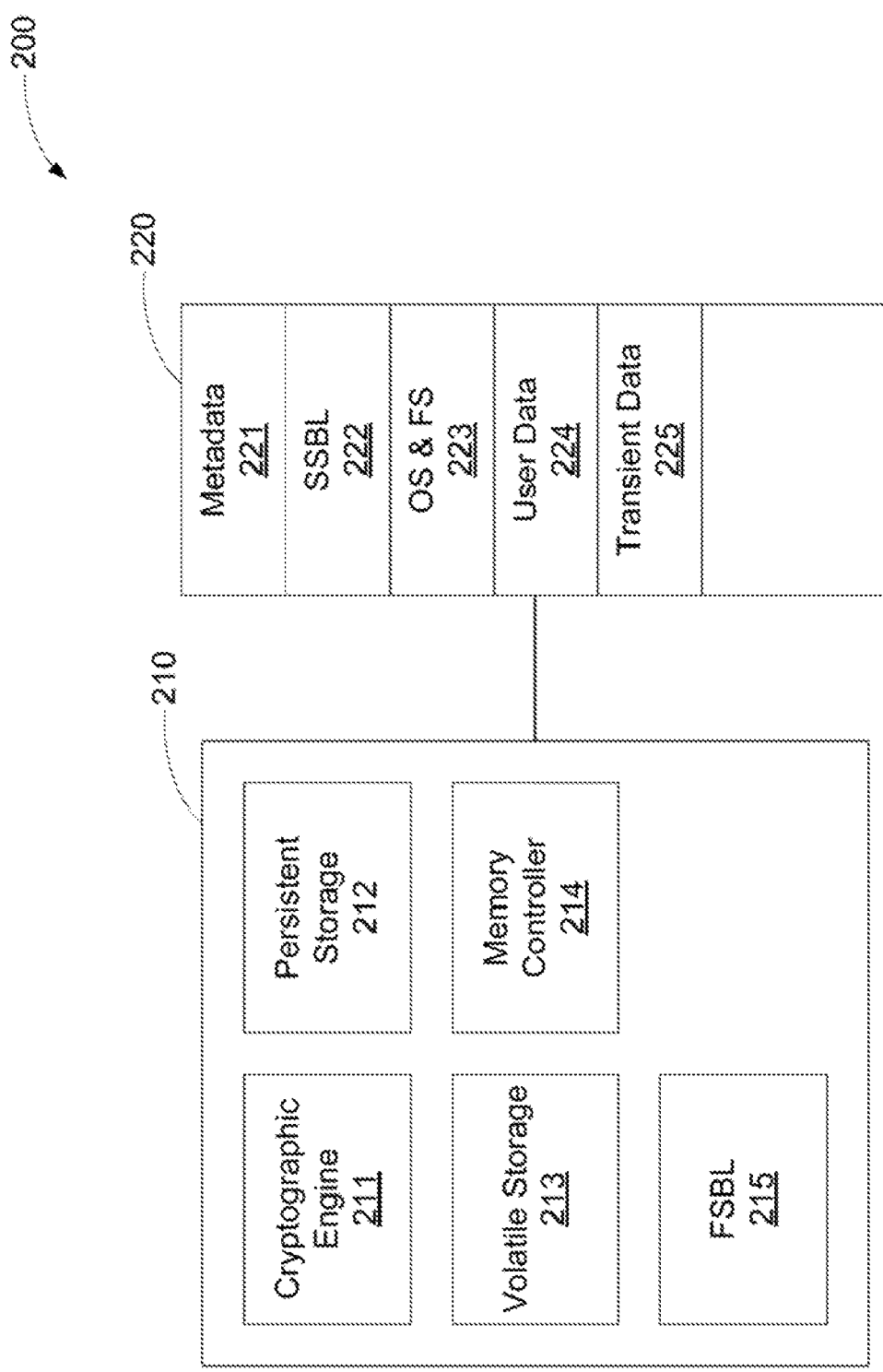
FIG. 2 is a block diagram of another example system to decrypt data on a computer-readable medium.

FIG. 2 is a block diagram of another example system 200 to decrypt data on a computer-readable medium 220. The system 200 may include a computer-readable medium 220 and an SoC 210 communicatively coupled with the computer-readable medium 220. The computer-readable medium 220 may include a plurality of regions 221-225. For example, the computer-readable medium 220 may include a region containing metadata 221, a region containing a second stage boot loader (SSBL) 222, a region containing an operating system (OS) and a file system (FS) 223 (e.g., file system metadata), a region containing user data 224, and a region containing transient data 225. In the illustrated example, the SoC 210 may include a cryptographic engine 211, persistent storage 212, volatile storage 213, a memory controller 214, and a first stage boot loader (FSBL) 215. In other examples, the cryptographic engine 211, persistent storage 212, volatile storage 213, memory controller 214, or FSBL 215 may not be included in an SoC 210. The SoC 210 may include a processor, such as a microprocessor (not shown).

The SoC 210 may store a root key. For example, the root key may be stored in the persistent storage 212, in the cryptographic engine 211, or the like. The persistent storage 212 or cryptographic engine 211 may have protections that make it difficult for an attacker to read or tamper with the root key. The cryptographic engine 211 may not make the root key available outside of the SoC 210. For example, the cryptographic engine 211 may not save the root key on the computer-readable medium 220. The root key may be generated and stored during manufacture, a first boot, or the like. In an example, the persistent storage 212 may include one-time programmable e-fuses to store the root key.

The cryptographic engine 211 may receive a request for data in a particular memory location from the memory controller 214. The cryptographic engine 211 may retrieve key generation information associated with the particular memory location from a tree in the metadata region 221. The metadata region 221 may indicate which memory locations are associated with each region and which key generation information is associated with each region. In an example, the key generation information may be directly associated with memory locations that can be decrypted using the key generation information.

The metadata region 221 may be cleartext. As used herein, the term "cleartext" refers to data that is unencrypted. The metadata region 221 may be digitally signed. As used herein, the term "digitally sign" refers to generating information corresponding to data being signed, that information being difficult to generate without a particular key or with different data. The metadata region 221 may be digitally signed using a message authentication code or an asymmetric key. The cryptographic engine 211 may authenticate the metadata region 221 prior to relying on the information contained therein (e.g., the key generation information, the relationships between regions and key generation information, etc.). As used herein, the term "authenticate" refers to determining that a digital signature corresponds to data purportedly signed by it and that a particular key generated the digital signature. Authenticating the metadata region 221 may ensure that only authorized modifications have been made to the metadata region 221. In an example, the metadata region 221 may be digitally signed and authenticated using a platform key. Key generation information for the platform key may be stored in the metadata region 221, and the platform key may be derived based on the root key and the key generation information.

The cryptographic engine 211 may generate a decryption key based on, the root key and the key generation information. The decryption key may be a symmetric key or an asymmetric key. In an example, the key generation information includes an encrypted copy of the decryption key, and the cryptographic engine 211 may generate the decryption key by decrypting the encrypted copy, for example, using the root key. Alternatively, or in addition, the key generation information may be a previously generated random number. The random number may have been combined, for example, with the root key or a descendant to produce the key used to encrypt the particular memory location of the computer-readable medium 220. The cryptographic engine 211 may combine the key generation information with the root key or the descendant in the same way to produce the decryption key for the particular memory location.

The cryptographic engine 211 may store the generated decryption key in the volatile storage 213. If power is lost, the decryption key may be erased from the volatile storage 213, and the cryptographic engine 211 may have to generate the decryption key again when power is restored. The cryptographic engine 211 may retrieve the data in the particular memory location indicated by the memory controller 214. The cryptographic engine 211 may decrypt the data from the particular memory location using the decryption key. The cryptographic engine 211 may transmit the decrypted data to the memory controller 214. The decryption key may be retained in the volatile storage 213 after decryption or may be discarded. In an example, the decryption key may be discarded a predetermined time after last use, a predetermined time after first use, when additional space is needed in the volatile storage 213, or the like. A decryption key associated with a user-configured passphrase may be discarded if at any point an incorrect passphrase is received.

The tree may include a plurality of levels. As used herein, the term "level" refers a group of nodes that are a same distance from a root node (e.g., children of the root node, grandchildren of the root node, etc.). In an example, only keys generated from leaf nodes are used to encrypt and decrypt data. As used herein, the term "leaf node" refers to a node that has no children. In alternate examples, non-leaf nodes may also, or instead, be used to encrypt and decrypt data. Intermediate nodes (i.e., nodes that are neither a root node nor a leaf node) may be used to generate keys for children of the intermediate nodes. For example, an intermediate key may be generated based on the root key and key generation information from a corresponding intermediate node, and a decryption key may be generated based on the intermediate key and key generation information from a child of the intermediate node. All or some of the nodes may include key generation information. In an example, every node other than the root node includes key generation information. Alternatively, or in addition, only leaf nodes may include key generation information.

In an example, the tree may include a branch that includes information for generating the platform key, a branch that includes information for generating a system key, a branch that includes information for generating a user key, and a branch for generating a volatile key. The cryptographic engine 211 may use different keys to encrypt, decrypt, digitally sign, or authenticate different regions 221-225 of the computer-readable medium 220. For example, the metadata region 221 may be cleartext but may be digitally signed with the platform key. The OS and FS region 223 may be encrypted with the system key or the user key. The user data region 224 may be encrypted with the user key. The transient data region 225 may be encrypted with the volatile key.

The cryptographic engine 211 may manage the keys differently based on their use. For example, the cryptographic engine 211 may require that a user correctly enter a passphrase to use the user key. The cryptographic engine 211 may verify the user-configured passphrase is correct before generating the user key from the corresponding key generation information. Alternatively, or in addition, the cryptographic engine 211 may generate the user key based on the passphrase in addition to the key generation information, and the correct passphrase may generate the correct user key. In some examples, the cryptographic engine 211 may generate the system key based on receiving a correct passphrase.

Some keys may be migratable or recoverable, and other keys non-migratable or non-recoverable. As used herein, the term "migratable" refers to keys allowed to be moved securely from one device to another. For migratable keys, the user may be able to migrate the encrypted data and the key to another device. For example, this migration may be done by securely moving a migratable key from a source device Trusted Platform Module (TPM) to a target device TPM. As used herein, the term "recoverable" refers to keys that can be generated even if the user forgets a passphrase needed to generate the key. For example, the user may reset a forgotten passphrase and be able to generate the key based on the reset passphrase. In an example, the system key or the user key may migratable or recoverable.

The user may move the computer-readable medium 220 to another computing system (not shown) or may make a block-for-block copy of the computer-readable medium 220 on the other computing system. The migratable keys may allow the other computing system to access the associated data. In an example, the platform key may be non-migratable, so, the other computing system may be unable to authenticate the metadata region 221. The other computing system may need to be paired with the computer-readable medium 220 or copied data. For example, the other computing system may digitally sign the metadata region 221 thereby securing it against modification. A user may control access to the computer-readable medium 220 or the copy until the other computing system has been paired to prevent unauthorized modification.

The cryptographic engine 211 may ensure that transient data (e.g., in the transient data region 225) is forgotten when the system 200 is shutdown. Since the computer-readable medium 220 may be non-volatile, the cryptographic engine 211 may ensure that the volatile key used to decrypt the transient data is forgotten when the system 200 is shutdown. The encrypted transient data 225 may remain on the computer-readable medium 220 but may be unreadable and thus effectively forgotten without the volatile key. In an example, key generation information for the volatile key may not be stored in the metadata region 221. The volatile key may be stored in the volatile storage 213 and thus erased therefrom when power is removed. If the system 200 enters a sleep state, key generation information for the volatile key may be stored on the computer-readable medium 220. For example, the key generation information for the volatile key may be saved in the tree. Alternatively, or in addition, key generation information for the volatile key may be save separate from the tree. In an example, the volatile key may be encrypted by the platform key and stored in the metadata region 221 separate from the tree. The volatile key may be regenerated when waking up from the sleep state.

When booting from a shutdown state, boot code may be read from the FSBL 215 initially. In some examples, the FSBL 215 may be trusted. For example, the FSBL 215 may be stored in an immutable read-only memory, in non-volatile storage on the SoC 210, or the like and thus may be difficult to modify. Accordingly, in some examples, the code from the FSBL 215 may be executed without authenticating it. The code from the FSBL 215 may be cleartext. The SSBL 222 may be digitally signed with a key from a vendor, such as a vendor private key. The FSBL 215 may include a key for authenticating the digital signature of the SSBL 222, such as a vendor public key. If the SSBL 222 is authenticated, code from the SSBL 222 may be executed. The code from the SSBL 222 may be cleartext.

A key or key generation information may be generated during booting. On a first boot after manufacture or after a factory reset, the cryptographic engine 211 may generate the platform key or system key and store key generation information for the generated platform key or system key in the tree in the metadata region 221. In an example, the cryptographic engine 211 may determine whether the platform key or system key exists and generate the platform key or system key if it does not. A volatile key may be generated during every boot. Key generation information for the volatile key may or may not be stored in the tree in the metadata region 221.

Figure 3:
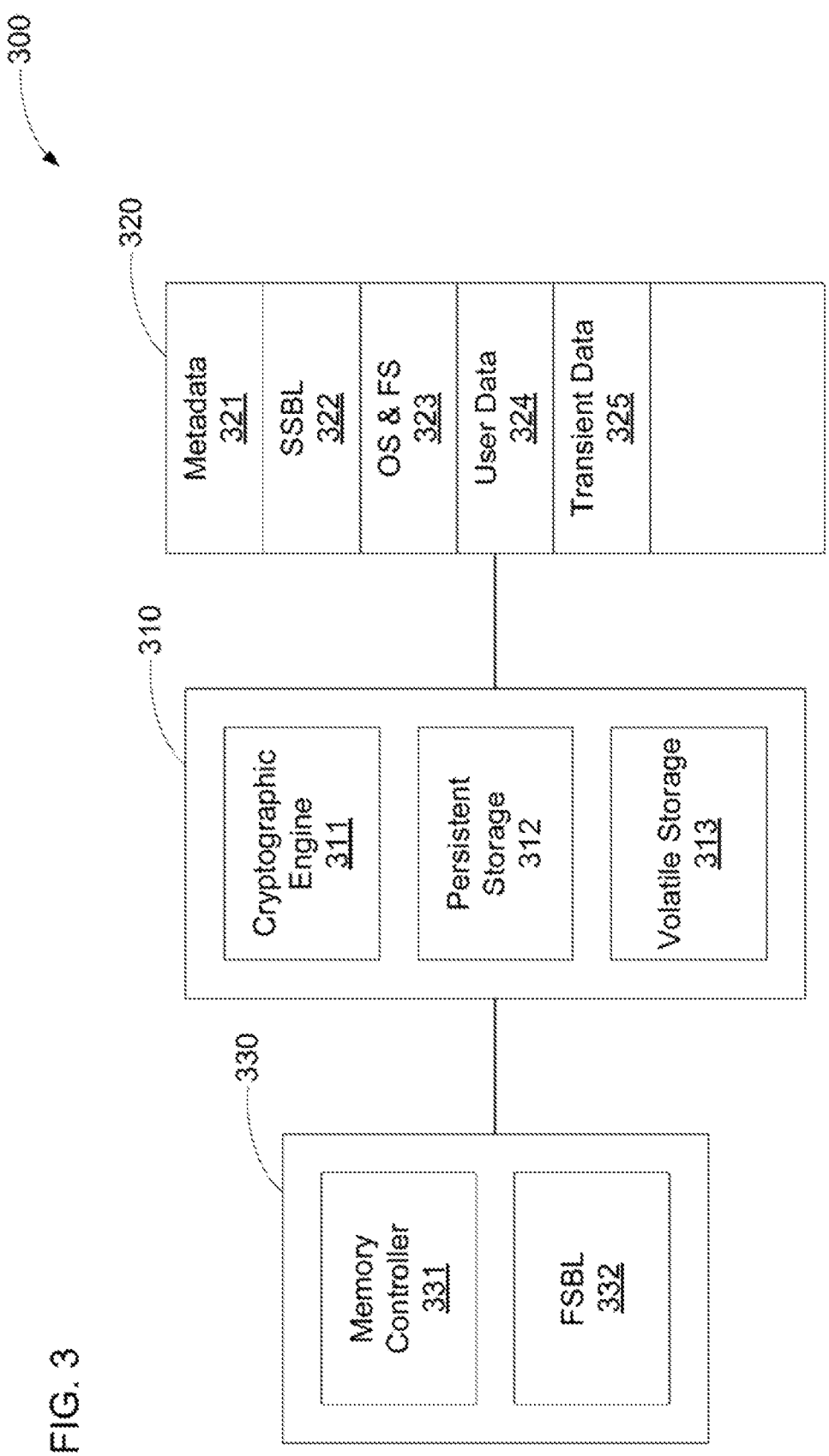
FIG. 3 is a block diagram of still another example system to decrypt data on a computer-readable medium.

FIG. 3 is a block diagram of still another example system 300 to decrypt data on a computer-readable medium 320. The system 300 may include a computer-readable medium 320 and discrete hardware 310 that includes a cryptographic engine 311. A processor chip 330 may include a memory controller 331 and an FSBL 332. The discrete hardware 310 may be located in the path between the memory controller 331 and the computer-readable medium 320. The cryptographic engine 311 may encrypt or decrypt data transferred between the memory controller 331 and the computer-readable medium 320.

The discrete hardware 310 may include persistent storage 312 and volatile storage 313. The cryptographic engine 311 may store keys in the persistent storage 312 or volatile storage 313. For example, the cryptographic engine 311 may store a root key in the persistent storage 312 and keys generated based on information in a metadata region 321 in the volatile storage 313. The computer-readable medium 320 may include a plurality of regions 321-325, which may be encrypted or digitally signed by different keys. Information for generating each key may be stored in a tree in the metadata region 321.

Figure 4:
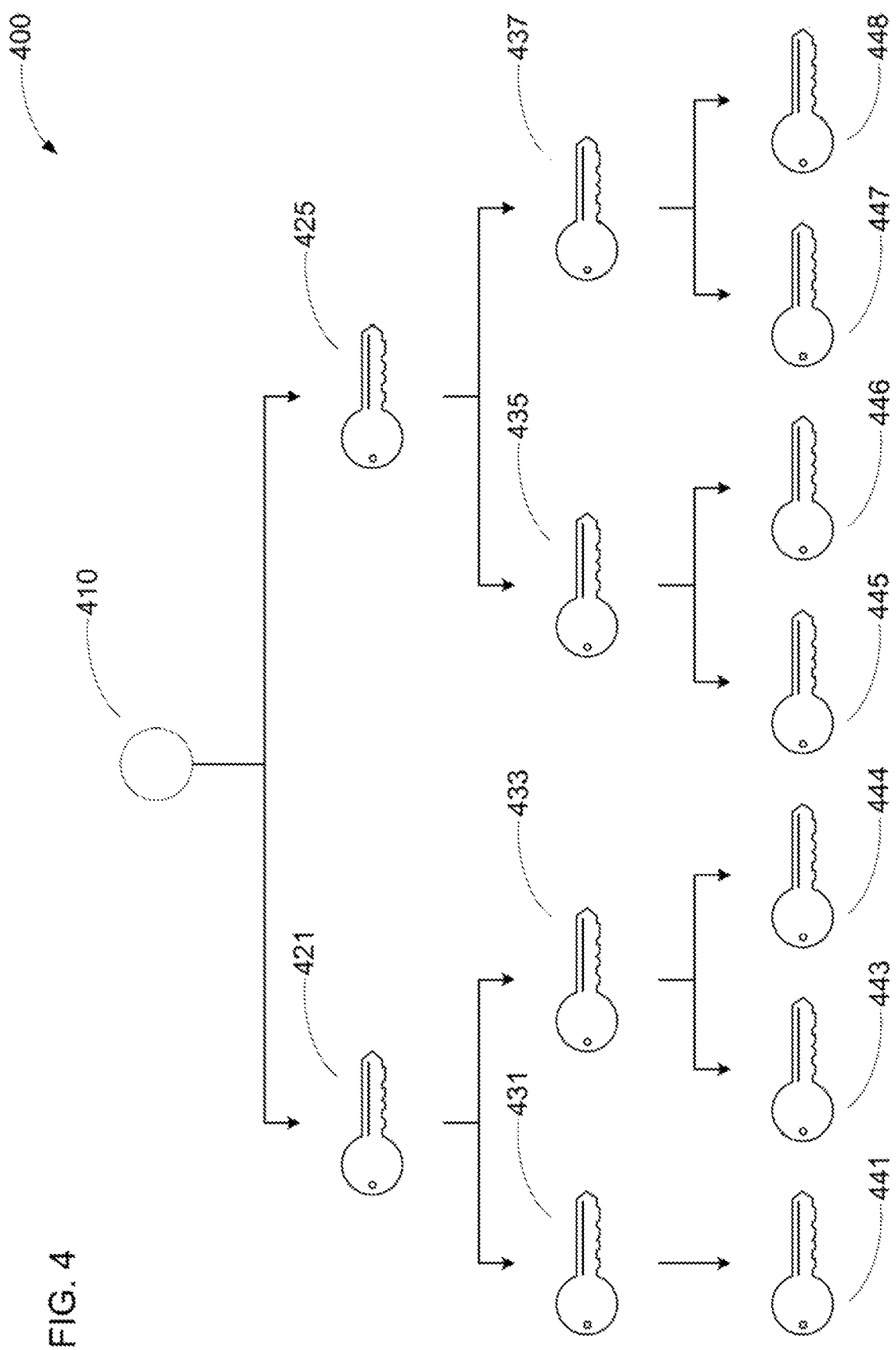
FIG. 4 is a schematic diagram of an example t that may be stored in, a metadata region of a computer-readable medium.

FIG. 4 is a schematic diagram of an example tree 400 that may be stored in a metadata region of a computer-readable medium. The number of levels, branches, and nodes may vary in other examples. The tree 400 may include a root node 410. In the illustrated example, the root node 410 may not include key generation information. For example, a root key may be stored elsewhere, such as in trusted persistent storage, and may not need to be generated. The root node 410 may include references to a plurality of child nodes 421, 425.

The child nodes 421, 425 may include a non-migratable key node 421 and a migratable key node 425. The non-migratable key node 421 may include key generation information for a non-migratable key, and the migratable key node 425 may include key generation information for a migratable key. The non-migratable key and migratable key may not be stored in the tree 400 but instead may be generated based on the corresponding key generation information and the root key. The non-migratable key or the migratable key may be generated based on a random number, based on a key derivation function, by decrypting an encrypted copy of the non-migratable or migratable key, or the like. For example, the non-migratable key and migratable key may be random numbers, and the key generation information may be copies of the non-migratable key and migratable key encrypted with the root key. Alternatively, or in addition, a number (e.g., a random number) may be used with the key derivation function to derive the non-migratable key and migratable key from the root key, and the key generation information may include the number used with the key derivation function. The key derivation function may be non-reversible and non-predictable, so the root key cannot be obtained if the non-migratable key or migratable key is compromised by an attacker.

In an example, the non-migratable key and migratable key may not be used to encrypt or decrypt data but instead to generate keys of child nodes 431-437 of the non-migratable key node 421 and migratable key node 425. In an example, the child nodes of the non-migratable key node 421 may include a master platform key node 431 and a master volatile key node 433. The child nodes of the migratable key node 425 may include a master system, key node 435 and a master user key node 437. The master platform key or master volatile key may be generated based on the non-migratable key and key generation information from the master platform key node 431 or master volatile key node 433 respectively. The master system key or master user key may be generated based on the migratable key and key generation information from the master system key node 435 or master user key node 437 respectively. Keys associated with children, grandchildren, etc. of the migratable key node 425 or the data associated with those keys may be movable to another device. Keys associated with children, grandchildren, etc. of the non-migratable key node 421 or the data associated with those keys may be restricted from being moved to another device.

The master platform key, master volatile key, master system key, and, master user key also may not be used to encrypt or decrypt data but instead to generate keys of child nodes 441-448 of the master key nodes 431-437. For example, a platform key may be generated based on the master platform key and key generation information from a platform key node 441. The platform key may be used to encrypt or decrypt persistent platform data, to sign metadata, or the like. In some examples, the platform key may be generated during a first boot of a computing device after manufacture or after a factory reset. In an example, the platform key may be generated without user input (e.g., a user passphrase).

Volatile keys may be generated based on the master volatile key and key generation information from volatile key nodes 443, 444. The volatile keys may be used to encrypt or decrypt transient data or the like. In an example, the volatile keys may be regenerated at every full boot of a computing device and forgotten when the computing device enters a shutdown state. The volatile key (e.g., an encrypted copy of the volatile key) or key generation information may be stored when the computing device enters a standby state to allow for access to the transient data during or after resumption from the standby state.

System keys may be generated based on the master system key and key generation information from system key nodes 445, 446. The system keys may be used to encrypt or decrypt system data (e.g., operating system data, file system metadata, etc.) or the like. The system keys may be generated during a first boot of a computing device after manufacture, after a factory reset, after an update to the operating system, or the like. In some examples, the system keys may be generated based on a user-configured passphrase, or a user-configured passphrase may be required for the system keys to be generated. The system keys or associated data may be migratable or recoverable.

User keys may be generated based, on the master user key and key generation information from user key nodes 447, 448. The user keys may be used to encrypt or decrypt user data. In an example, each key may be associated with a user. User keys may be generated in response to user requests and may incorporate a user-configured passphrase. For example, user keys may be generated based on the user-configured passphrase in addition to the master user key and the key generation information, or a user-configured passphrase may be required for the user keys to be generated. The user keys or associated data may be migratable or recoverable.

The child nodes 441-448 of the master key nodes 431-437 may be leaf nodes of the tree 400. The leaf keys (e.g., the platform key, volatile key, system key, and user key), the intermediate keys (e.g., the non-migratable key, migratable key, master platform key, master volatile key, master system, and master user key), or the root key may be symmetric or asymmetric. In some examples, the root key and intermediate keys are only used to encrypt, decrypt, or derive child keys, and the leaf keys are only used to encrypt or decrypt data. Alternatively, or in addition, some or all of the root key, intermediate keys, or leaf keys may be used to generate child keys as well as encrypt or decrypt data. In an example, the tree 400 may be stored in the metadata region 221 of FIG. 2.

Figure 5:
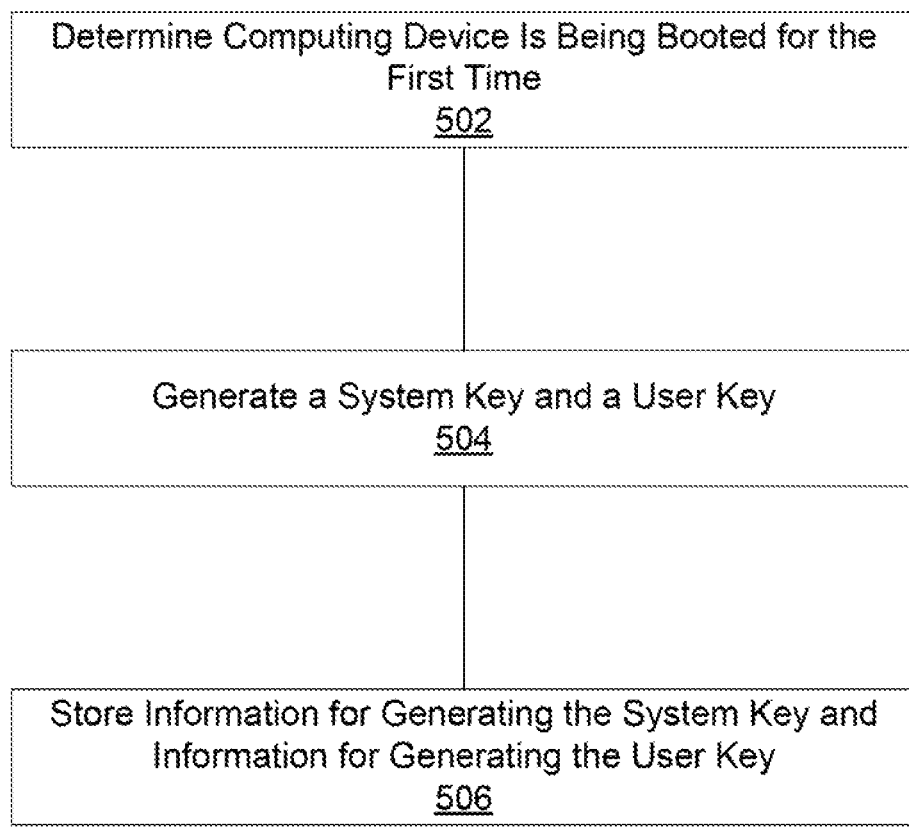
FIG. 5 is a flow diagram of an example method to generate and store keys on a computer-readable medium.

FIG. 5 is a flow diagram of an example method 500 to generate and store keys on a computer-readable medium. A processor may perform the method 500. Block 502 may include determining a computing device is being booted for the first time. The computing device may include a computer-readable medium. In an example, the computer-readable medium may be non-volatile main memory. Determining the computing device is being booted for the first time may include determining that a metadata region of the computer-readable medium is lacking information. For example, the metadata region may not include a key, an indication that the computing device has been booted previously, or the like. Determining the computing device is being booted for the first may be performed while booting the computing device.

At block 504, the method may include generating a system key to encrypt a region of the computer-readable medium containing system data and generating a user key to encrypt a region of the computer-readable medium containing user data. In an example, the system key or the user key may be generated during booting. Alternatively, or in addition, the system key or the user key may be generated based on receiving a user request to generate the system key or user key. Generating the system key or the user key may include deriving the system key or the user key or randomly selecting the system key or the user key.

Block 506 may include storing information for generating the system key in a first branch, of a tree on the computer-readable medium and information for generating the user key in a second branch of the tree different from the first branch. Storing the information may include instructing the computer-readable medium to store the information. The information for generating the system key or user key may include information usable to derive the system key or user key from a root key, an encrypted copy of the system key or user key, or the like. The node from which the first branch and the second branch descend may be a parent, grandparent, great-grandparent, or the like of the nodes containing the information for generating the system key or the user key. In an example, the cryptographic engine 110 of FIG. 1 may perform blocks 502-506, and the tree on the computer readable medium may be the tree 400 of FIG. 4.

Figure 6:
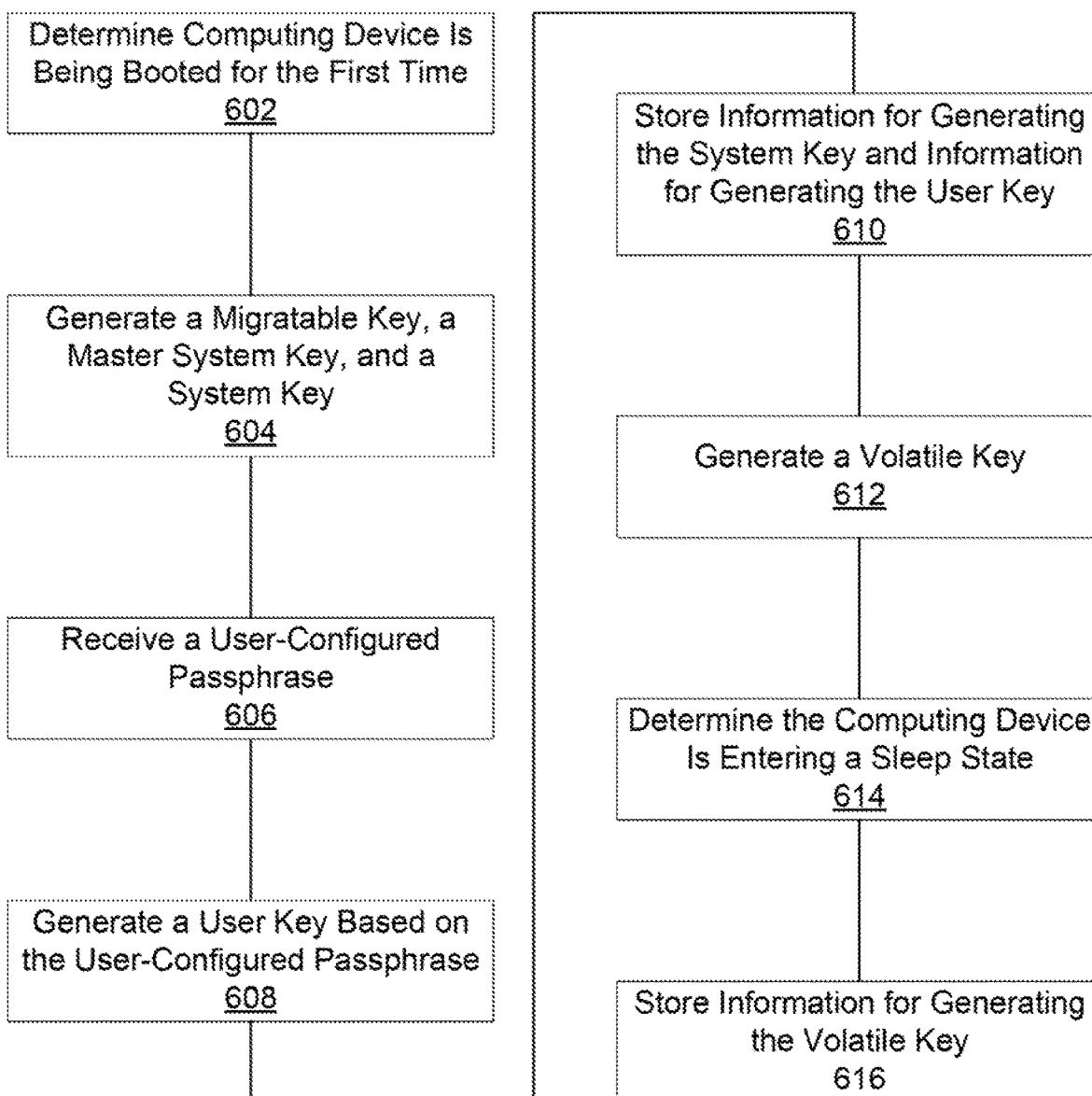
FIG. 6 is a flow diagram of another example method to generate and store keys on a computer-readable medium.

FIG. 6 is a flow diagram of another example method 600 to generate and store keys on a computer-readable medium. At block 602, the method 600 may include determining a computing device that includes a computer-readable medium is being booted for the first time. For example, it may be determined that the computing device is being booted for the first time by analyzing a metadata region of the computer-readable medium. Block 604 may include generating a migratable key based on a root key, generating a master system key based on the migratable key, and generating a system key based on the master system key. For example, the migratable key may be derived based on the root key; the master system key may be derived based on the migratable key; and the system key may be derived from the master system key. In an example, the keys may be derived using a key derivation function.

Block 606 may include receiving a user-configured passphrase. For example, a user may wish to create a new user account with an associated region of the computer-readable medium to store data for the new user account. A passphrase for the new user account may be entered by the user and may be received from a user interface, a processor, or the like. At block 608, the method 600 may include generating a user key based on the user-configured passphrase. For example, the user key may be derived based on a root key, the user-configured passphrase, and additional key generation information.

At block 610, the method 600 may include storing information for generating the system key in a first branch of a tree on the computer-readable medium and information for generating the user key in a second branch of the tree different from the first branch. In an example, information for generating the migratable key from a root key may be stored as a child of a root node. Information for generating the master system key from the migratable key may be stored as a child of the migratable key node (e.g., a grandchild of the root node). Information for generating the system key from the master system key may be stored as a child of the master system key node (e.g., a great-grandchild of the root node). Similarly, information for generating the user key may be stored as a grandchild of the migratable key node and a child of a master user key node.

Block 612 may include generating a volatile key to encrypt a region of the computer-readable medium containing transient data. The volatile key may be generated during booting of the computing device. The volatile key may be derived from a root key. For example, the volatile key may be derived from a master volatile key, which may be derived from a non-migratable key. The non-migratable key may be derived from a root key. Block 614 may include determining the computing device is entering a sleep state. For example, a processor of the computing device may decide the computing device should enter the sleep state, or a user may indicate to the processor that the computing device should enter the sleep state. An indication that the device is entering the sleep state may be received from the processor.

Block 616 may include storing information for generating the volatile key in a third branch of the tree. The information for generating the volatile key may be stored in the third branch based on determining the computing device is entering the sleep state. In an example, information for generating a non-migratable key based on a root key may be stored as a child of a root node. Information, for generating a master volatile key based on the non-migratable key may be stored as a child of the non-migratable key node (e.g., a grandchild of the root node). The information for generating the volatile key based on the master volatile key may be stored as a child of the master volatile key node (e.g., a great-grandchild of the root node). Alternatively, or in addition the information for generating the volatile key may be stored in a location separate from the tree. For example, an encrypted copy of the volatile key may be stored in the location separate from the tree. In an example, the cryptographic engine 211 of FIG. 2 may perform blocks 602-616, and the tree on the computer-readable medium may be the tree 400 of FIG. 4.

Figure 7:
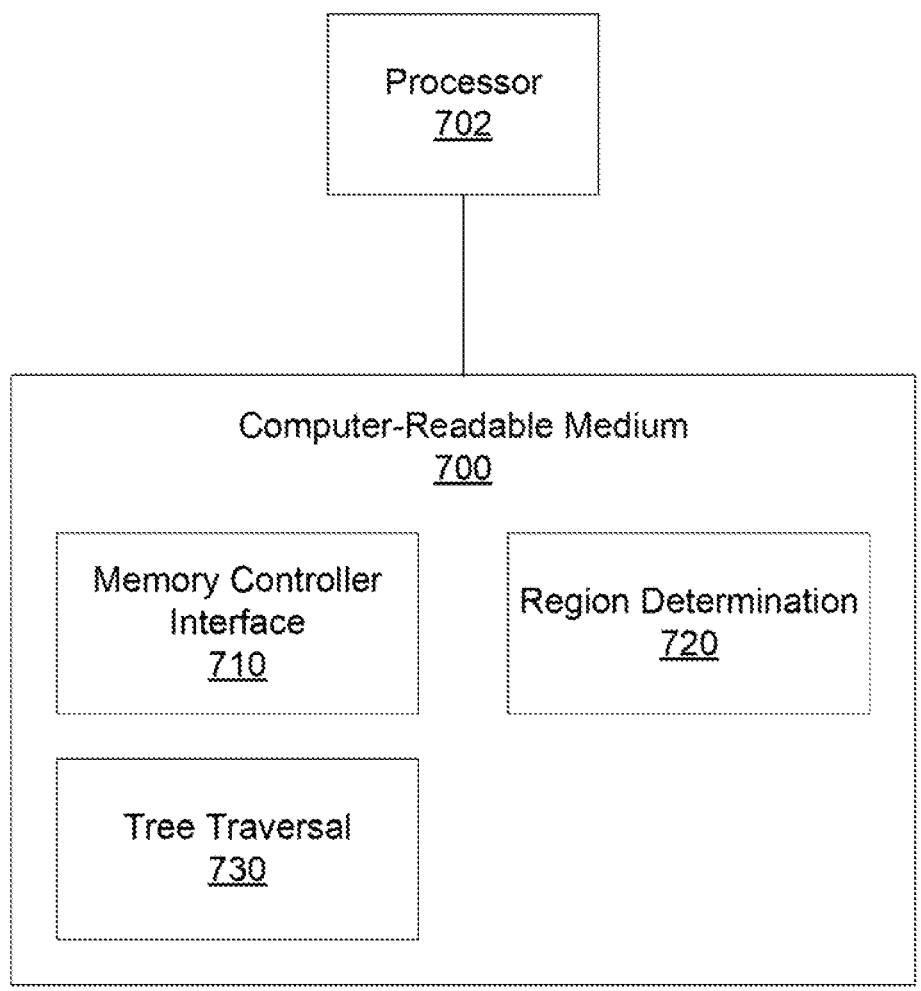
FIG. 7 is a block diagram of an example computer-readable medium including instructions that cause a processor to determine key generation information for a decryption key.

FIG. 7 is a block diagram of an example computer-readable medium 700 including instructions that, when executed by a processor 702, cause the processor 702 to determine key generation information for a decryption key. The computer-readable medium 700 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 702 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 700 may include a memory controller interface module 710. As used herein, a "module" (in some examples referred to as a "software module") is a set of instructions that when executed or interpreted by a processor or stored at a processor-readable medium realizes a component or performs a method. The memory controller interface module 710 may include instructions that cause the processor 702 to receive a request for data. For example, the request for data may be received from a memory controller. The memory controller interface module 710 may cause the processor 702 to extract an address for the data from the request.

The computer-readable medium 700 may include a region determination module 720. The region determination module 720 may cause the processor 702 to determine a region containing the data based on metadata. For example, the metadata may be contained in another computer-readable medium (not shown), the computer-readable medium 700, or the like. The metadata may include a data structure indicating which data addresses are associated with which regions. The regions may be regions of the other computer-readable medium, of the computer-readable medium 700, or the like. The region determination module 720 may cause the processor 702 to look up the address of the requested data in the metadata to determine which region is associated with the address.

The computer-readable medium 700 may include a tree traversal module 730. The tree traversal module 730 may cause the processor 702 to traverse a tree in the metadata to determine key generation information relating a decryption key for the region to a root key. In an example, some regions may be associated with keys. For example, each leaf of the tree may include key generation information for an associated region. Alternatively, or in addition, intermediate nodes or a root node may include key generation information for associated regions. The key generation information may be usable to generate the decryption key from the root key. The tree traversal module 730 may cause the processor 702 to determine the key generation information by retrieving the key generation information from the tree. In an example, the tree traversal module 730 may cause the processor 702 to retrieve key generation information from each node in the tree that is traversed by the processor 702 after the root node. In an example, the memory controller interface module 710, the region determination module 720, or the tree traversal module 730, when executed by the processor 702, may realize the cryptographic engine 110 of FIG. 1.

Figure 8:
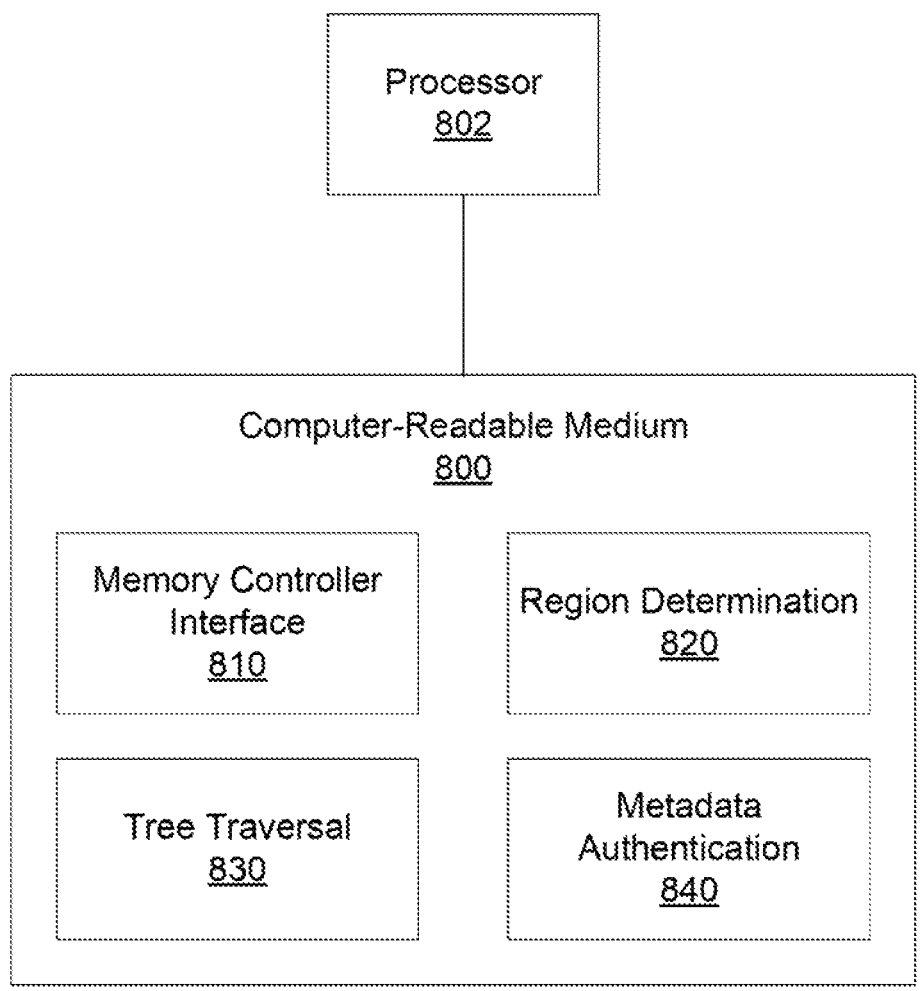
FIG. 8 is a block diagram of another example computer-readable medium including instructions that cause a processor to determine key generation information for a decryption key.

FIG. 8 is a block diagram of an example computer-readable medium 800 including instructions that, when executed by a processor 802, cause the processor 802 to determine key generation information for a decryption key. The computer-readable medium 800 may include a memory controller interface module 810 that causes the processor 802 to receive a request for data. The computer-readable medium 800 may also include a region determination module 820 that causes the processor 802 to determine a region containing the data based on metadata.

In addition, the computer-readable medium 800 may include a tree traversal module 830. The tree traversal module 830 may cause the processor 802 to traverse a tree in the metadata to determine key generation information relating a decryption key for the region to a root key. In an example, the tree may include a branch for migratable keys and a branch for non-migratable keys. The migratable keys may be keys for which the computer-readable medium 800 will cause the processor 802 to provide the key, data decrypted by the key, or the like to a user in response to a proper request to do so. The non-migratable keys may be keys for which the computer-readable medium 800 will cause the processor 802 to refuse any request to output the key, data decrypted by the key, or the like.

In an example, the tree may include a plurality of branches for a plurality of system keys and a plurality of branches for a plurality of user keys. For example, there may be a plurality of operating systems, a plurality of file systems, or the like, and each operating system or file system may be associated with a system key. There may also, or instead, be a plurality of users, and each user may be associated with a user key. Each system and each user may be associated with a region in another computer-readable medium (not shown), the computer-readable medium 800, or the like. When data for a region associated with a particular system or user is requested, the region determination module 820 may cause the processor 802 to determine that region, and the tree traversal 830 may cause the processor 802 to determine key generation information usable to generate a decryption key to decrypt that region.

The key generation information may include a random number usable to compute the decryption key for the data from the root key. For example, the tree traversal module 830 may cause the processor 802 to derive the decryption key based on a key derivation function taking the random number as an input. The tree traversal module 830 may cause the processor 802 to retrieve the random number when traversing the tree. In an example, each node of the tree other than a root node may include a random number usable to derive a key associated with that node. The tree traversal module 830 may cause the processor 802 to derive the key for a current node by applying a key derivation function to a key associated with a parent node using the key generation information for the current node as an input to the key derivation function. The tree traversal module 830 may cause the processor 802 to generate the key for each node traversed, other than the root node, until it reaches the node associated with the decryption key needed to decrypt the data. In an example, the tree traversal module 830 may cause the processor 802 to traverse the tree until it reaches a leaf node. The computer-readable medium 800 may cause the processor 802 to decrypt the data using the decryption key.

The computer-readable medium 800 may include a metadata authentication module 840. The metadata authentication module 840 may cause the processor 802 to authenticate the metadata. For example, the metadata authentication module 840 may cause the processor 802 to authenticate the metadata before determining the region, before traversing the tree, before decrypting the requested data with the decryption key, or the like. In an example, the metadata authentication module 840 may cause the processor 802 to authenticate the metadata based on a platform key. The tree traversal module 830 may cause the processor 802 to traverse the tree to determine key generation information relating the platform key to the root key and generate the platform key based on the key generation information and the root key. Referring to FIG. 2, the memory controller interface module 810, the region determination module 820, the tree traversal module 830, or the metadata authentication module 840, when executed by the processor 802, may realize the cryptographic engine 211, for example.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A method, comprising:
   determining a computing device comprising a memory on a system on a chip (SOC) and a computer-readable medium is being booted for a first time;
   generating a system key to encrypt a region of the computer-readable medium containing system data and a user key to encrypt a region of the computer-readable medium containing user data; and
   storing information for generating the system key in a first branch of a tree on the computer-readable medium and information for generating the user key in a second branch of the tree different from the first branch, wherein the computer-readable medium includes an unencrypted metadata region to store the tree and to indicate locations of a plurality of regions of the computer-readable medium, wherein the unencrypted metadata region is signed by a platform key, wherein the platform key is derivable from key generation information obtained from the tree and a root key stored in the memory on the SOC.

2. The method of claim 1, wherein generating the system key comprises generating a migratable key based on the root key, generating a master system key based on the migratable key, and generating the system key based on the master system key.

3. The method of claim 2, further comprising storing information for generating the migratable key from the root key in the tree as a child of a root node and information for generating the master system key from the migratable key as a grandchild of the root node beneath the child.

4. The method of claim 1, wherein generating the user key comprises generating the user key based on a user-configured passphrase.

5. The method of claim 1, further comprising:
   generating a volatile key to encrypt a region of the computer-readable medium containing transient data;
   determining the computing device is entering a sleep state; and
   storing information for generating the volatile key in a third branch of the tree.

6. The method of claim 1, further comprising:
   storing the root key.

7. The method of claim 6, further comprising:
   receiving a request for the system data;
   determining a first region of the plurality of regions of the computer-readable medium containing the system data based on the unencrypted metadata region; and
   traversing the tree in the unencrypted metadata region to determine key generation information relating a decryption key for the first region to the root key.

8. The method of claim 7, further comprising:
   retrieving the key generation information for the first of the plurality of regions of the computer-readable medium from the tree;
   generating the decryption key for the first region based on the root key and the key generation information; and
   decrypting the system data from the region using the decryption key.

9. The method of claim 7, wherein the key generation information includes an encrypted copy of the decryption key.

10. The method of claim 7, wherein the decryption key is stored in a volatile buffer.

11. The method of claim 6, wherein the key generation information includes a random number to compute the decryption key for the system data from the root key.

* * * * *